United States Patent
Ware et al.

(10) Patent No.: US 12,411,729 B2
(45) Date of Patent: Sep. 9, 2025

(54) ENERGY-EFFICIENT ERROR-CORRECTION-DETECTION STORAGE

(71) Applicant: Rambus Inc., San Jose, CA (US)

(72) Inventors: Frederick A. Ware, Los Altos Hills, CA (US); John E. Linstadt, Palo Alto, CA (US); Liji Gopalakrishnan, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/757,268

(22) Filed: Jun. 27, 2024

(65) Prior Publication Data
US 2024/0411640 A1   Dec. 12, 2024

Related U.S. Application Data

(63) Continuation of application No. 18/306,542, filed on Apr. 25, 2023, now Pat. No. 12,050,513, which is a continuation of application No. 17/721,735, filed on Apr. 15, 2022, now Pat. No. 11,675,657, which is a continuation of application No. 16/832,263, filed on Mar. 27, 2020, now Pat. No. 11,327,831, which is a continuation of application No. 15/963,163, filed on Apr. 26, 2018, now Pat. No. 10,613,924.

(60) Provisional application No. 62/507,514, filed on May 17, 2017.

(51) Int. Cl.
*G06F 11/10* (2006.01)
*G06F 3/06* (2006.01)

(52) U.S. Cl.
CPC ........ *G06F 11/1004* (2013.01); *G06F 3/0619* (2013.01); *G06F 3/064* (2013.01); *G06F 3/0673* (2013.01)

(58) Field of Classification Search
None
See application file for complete search history.

(56) References Cited

U.S. PATENT DOCUMENTS

| 6,262,924 B1 | 7/2001 | Fukutani et al. |
| 7,877,665 B2 | 1/2011 | Mokhlesi |
| 10,613,924 B2 | 4/2020 | Ware et al. |

(Continued)

FOREIGN PATENT DOCUMENTS

JP   2012043514 A   *   3/2012

OTHER PUBLICATIONS

Doe Hyun et al. "Virtualized and Flexible ECC for Main Memory", Fifteenth International Conference on Architectural Support for Programming Languages and Operating Systems (ASPLOS), Mar. 17, 2010. 26 pages.

*Primary Examiner* — Guerrier Merant
(74) *Attorney, Agent, or Firm* — Silicon Edge Law Group LLC; Arthur J. Behiel

(57) ABSTRACT

A memory system employs an addressing scheme to logically divide rows of memory cells into separate contiguous regions, one for data storage and another for error detection and correction (EDC) codes corresponding to that data. Data and corresponding EDC codes are stored in the same row of the same bank. Accessing data and corresponding EDC code in the same row of the same bank advantageously saves power and avoids bank conflicts. The addressing scheme partitions the memory without requiring the requesting processor to have an understanding of the memory partition.

17 Claims, 13 Drawing Sheets

(56) References Cited

U.S. PATENT DOCUMENTS

| | | |
|---|---|---|
| 11,327,831 B2 | 5/2022 | Ware et al. |
| 2006/0117155 A1* | 6/2006 | Ware ............... G11C 7/1042 |
| | | 711/163 |
| 2008/0034270 A1 | 2/2008 | Onishi et al. |
| 2008/0163028 A1 | 7/2008 | Mokhlesi |
| 2009/0019321 A1 | 1/2009 | Radke |
| 2009/0019340 A1 | 1/2009 | Radke et al. |
| 2010/0235695 A1 | 9/2010 | Lee et al. |
| 2011/0209028 A1 | 8/2011 | Post et al. |
| 2012/0311406 A1 | 12/2012 | Ratnam et al. |
| 2013/0080856 A1 | 3/2013 | Bueb |
| 2013/0086312 A1 | 4/2013 | Miura |
| 2014/0047246 A1 | 2/2014 | Seol et al. |
| 2014/0108889 A1 | 4/2014 | Shaeffer |
| 2014/0344546 A1* | 11/2014 | Ware ............... G06F 3/0659 |
| | | 711/168 |
| 2015/0067448 A1 | 3/2015 | Son et al. |
| 2016/0005452 A1 | 1/2016 | Bae et al. |
| 2016/0254059 A1* | 9/2016 | Ochi ............... G11C 16/26 |
| | | 365/185.22 |
| 2018/0335942 A1* | 11/2018 | Yeh ............... G06F 3/0659 |

\* cited by examiner

600 → Apso = 111b          128 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 111 | 000 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 111 | 001 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 111 | 010 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 111 | 011 |

| Aps[2:0] | Apc[2:0] | Apc=111 | Ams[2:0] | Amc[2:0] |
|---|---|---|---|---|
| 100 | 000 | 0 | 100 | 000 |
| 100 | 001 | 0 | 100 | 001 |
| 100 | 010 | 0 | 100 | 010 |
| 100 | 011 | 0 | 100 | 011 |
| 100 | 100 | 0 | 100 | 100 |
| 100 | 101 | 0 | 100 | 101 |
| 100 | 110 | 0 | 100 | 110 |
| 100 | 111 | 1 | 111 | 100 |
| 101 | 000 | 0 | 101 | 000 |
| 101 | 001 | 0 | 101 | 001 |
| 101 | 010 | 0 | 101 | 010 |
| 101 | 011 | 0 | 101 | 011 |
| 101 | 100 | 0 | 101 | 100 |
| 101 | 101 | 0 | 101 | 101 |
| 101 | 110 | 0 | 101 | 110 |
| 101 | 111 | 1 | 111 | 101 |
| 110 | 000 | 0 | 110 | 000 |
| 110 | 001 | 0 | 110 | 001 |
| 110 | 010 | 0 | 110 | 010 |
| 110 | 011 | 0 | 110 | 011 |
| 110 | 100 | 0 | 110 | 100 |
| 110 | 101 | 0 | 110 | 101 |
| 110 | 110 | 0 | 110 | 110 |
| 110 | 111 | 1 | 111 | 110 |
| ~~111~~ | ~~000~~ | 0 | 111 | 000 |
| ~~111~~ | ~~001~~ | 0 | 111 | 001 |
| ~~111~~ | ~~010~~ | 0 | 111 | 010 |
| ~~111~~ | ~~011~~ | 0 | 111 | 011 |
| ~~111~~ | ~~100~~ | 0 | 111 | 100 |
| ~~111~~ | ~~101~~ | 0 | 111 | 101 |
| ~~111~~ | ~~110~~ | 0 | 111 | 110 |
| 111 | 111 | 1 | 111 | 111 |

Apso =101b     96 slices

| Aps[2:0] | Apc[2:0] | Apc=111 | Ams[2:0] | Amc[2:0] | Aps[2:0] | Apc[2:0] | Apc=111 | Ams[2:0] | Amc[2:0] |
|---|---|---|---|---|---|---|---|---|---|
| 000 | 000 | 0 | 000 | 000 | 100 | 000 | 0 | 100 | 000 |
| 000 | 001 | 0 | 000 | 001 | 100 | 001 | 0 | 100 | 001 |
| 000 | 010 | 0 | 000 | 010 | 100 | 010 | 0 | 100 | 010 |
| 000 | 011 | 0 | 000 | 011 | 100 | 011 | 0 | 100 | 011 |
| 000 | 100 | 0 | 000 | 100 | 100 | 100 | 0 | 100 | 100 |
| 000 | 101 | 0 | 000 | 101 | 100 | 101 | 0 | 100 | 101 |
| 000 | 110 | 0 | 000 | 110 | 100 | 110 | 0 | 100 | 110 |
| 000 | 111 | 1 | 101 | 010 | 100 | 111 | 1 | 101 | 110 |
| 001 | 000 | 0 | 001 | 000 | 101 | 000 | 0 | 101 | 000 |
| 001 | 001 | 0 | 001 | 001 | 101 | 001 | 0 | 101 | 001 |
| 001 | 010 | 0 | 001 | 010 | 101 | 010 | 0 | 101 | 010 |
| 001 | 011 | 0 | 001 | 011 | 101 | 011 | 0 | 101 | 011 |
| 001 | 100 | 0 | 001 | 100 | 101 | 100 | 0 | 101 | 100 |
| 001 | 101 | 0 | 001 | 101 | 101 | 101 | 0 | 101 | 101 |
| 001 | 110 | 0 | 001 | 110 | 101 | 110 | 0 | 101 | 110 |
| 001 | 111 | 1 | 101 | 011 | 101 | 111 | 1 | 101 | 111 |
| 010 | 000 | 0 | 010 | 000 | 110 | 000 | 0 | 110 | 000 |
| 010 | 001 | 0 | 010 | 001 | 110 | 001 | 0 | 110 | 001 |
| 010 | 010 | 0 | 010 | 010 | 110 | 010 | 0 | 110 | 010 |
| 010 | 011 | 0 | 010 | 011 | 110 | 011 | 0 | 110 | 011 |
| 010 | 100 | 0 | 010 | 100 | 110 | 100 | 0 | 110 | 100 |
| 010 | 101 | 0 | 010 | 101 | 110 | 101 | 0 | 110 | 101 |
| 010 | 110 | 0 | 010 | 110 | 110 | 110 | 0 | 110 | 110 |
| 010 | 111 | 1 | 101 | 100 | 110 | 111 | 1 | 111 | 110 |
| 011 | 000 | 0 | 011 | 000 | 111 | 000 | 0 | 111 | 000 |
| 011 | 001 | 0 | 011 | 001 | 111 | 001 | 0 | 111 | 001 |
| 011 | 010 | 0 | 011 | 010 | 111 | 010 | 0 | 111 | 010 |
| 011 | 011 | 0 | 011 | 011 | 111 | 011 | 0 | 111 | 011 |
| 011 | 100 | 0 | 011 | 100 | 111 | 100 | 0 | 111 | 100 |
| 011 | 101 | 0 | 011 | 101 | 111 | 101 | 0 | 111 | 101 |
| 011 | 110 | 0 | 011 | 110 | 111 | 110 | 0 | 111 | 110 |
| 011 | 111 | 1 | 101 | 101 | 111 | 111 | 1 | 111 | 111 |

Apso =100b

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 100 | 011 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 100 | 100 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 100 | 101 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 100 | 110 |

80 slices

| Aps[2:0] | Apc[2:0] | Apc=111 | Ams[2:0] | Amc[2:0] |
|---|---|---|---|---|
| 100 | 000 | 0 | 100 | 000 |
| 100 | 001 | 0 | 100 | 001 |
| 100 | 010 | 0 | 100 | 010 |
| 100 | 011 | 0 | 100 | 011 |
| 100 | 100 | 0 | 100 | 100 |
| 100 | 101 | 0 | 100 | 101 |
| 100 | 110 | 0 | 100 | 110 |
| 100 | 111 | 1 | 100 | 111 |
| 101 | 000 | 0 | 101 | 000 |
| 101 | 001 | 0 | 101 | 001 |
| 101 | 010 | 0 | 101 | 010 |
| 101 | 011 | 0 | 101 | 011 |
| 101 | 100 | 0 | 101 | 100 |
| 101 | 101 | 0 | 101 | 101 |
| 101 | 110 | 0 | 101 | 110 |
| 101 | 111 | 1 | 101 | 111 |
| 110 | 000 | 0 | 110 | 000 |
| 110 | 001 | 0 | 110 | 001 |
| 110 | 010 | 0 | 110 | 010 |
| 110 | 011 | 0 | 110 | 011 |
| 110 | 100 | 0 | 110 | 100 |
| 110 | 101 | 0 | 110 | 101 |
| 110 | 110 | 0 | 110 | 110 |
| 110 | 111 | 1 | 111 | 110 |
| 111 | 000 | 0 | 111 | 000 |
| 111 | 001 | 0 | 111 | 001 |
| 111 | 010 | 0 | 111 | 010 |
| 111 | 011 | 0 | 111 | 011 |
| 111 | 100 | 0 | 111 | 100 |
| 111 | 101 | 0 | 111 | 101 |
| 111 | 110 | 0 | 111 | 110 |
| 111 | 111 | 1 | 111 | 111 |

Apso =011b          64 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 011 | 100 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 011 | 101 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 011 | 110 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| ~~011~~ | ~~100~~ | 0 | 011 | 100 |
| ~~011~~ | ~~101~~ | 0 | 011 | 101 |
| ~~011~~ | ~~110~~ | 0 | 011 | 110 |
| ~~011~~ | ~~111~~ | 1 | 011 | 111 |

Apso =010b          48 slices

| Aps[2:0] | Apc[2:0] | Apc=111 | Ams[2:0] | Amc[2:0] |
|---|---|---|---|---|
| 000 | 000 | 0 | 0 | 000 |
| 000 | 001 | 0 | 0 | 001 |
| 000 | 010 | 0 | 0 | 010 |
| 000 | 011 | 0 | 0 | 011 |
| 000 | 100 | 0 | 0 | 100 |
| 000 | 101 | 0 | 0 | 101 |
| 000 | 110 | 0 | 0 | 110 |
| 000 | 111 | 1 | 010 | 101 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 010 | 110 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 010 | 111 |
| ~~011~~ | ~~000~~ | 0 | 011 | 000 |
| ~~011~~ | ~~001~~ | 0 | ~~011~~ | ~~001~~ |
| ~~011~~ | ~~010~~ | 0 | ~~011~~ | ~~010~~ |
| ~~011~~ | ~~011~~ | 0 | 011 | 011 |
| ~~011~~ | ~~100~~ | 0 | 011 | 100 |
| ~~011~~ | ~~101~~ | 0 | ~~011~~ | ~~101~~ |
| ~~011~~ | ~~110~~ | 0 | ~~011~~ | ~~110~~ |
| 011 | 111 | 1 | ~~011~~ | ~~111~~ |

Apso =001b      32 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 001 | 110 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 001 | 111 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 011 | 110 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 011 | 111 |

Apso =000b      16 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 000 | 111 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 010 | 110 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 010 | 111 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 011 | 111 |

FIG. 12

ENERGY-EFFICIENT ERROR-CORRECTION-DETECTION STORAGE

FIELD OF THE INVENTION

The subject matter presented herein relates generally to computer memory.

BACKGROUND

Personal computers, workstations, and servers commonly include at least one processor, such as a central processing unit (CPU), and some form of memory system that includes dynamic, random-access memory (DRAM). The processor executes instructions and manipulates data stored in the DRAM.

DRAM stores binary bits by alternatively charging or discharging capacitors to represent the logical values one and zero. The capacitors are exceedingly small. Their ability to store charge can be hindered by manufacturing variations or operational stresses, and their stored charges can be upset by electrical interference or high-energy particles. The resultant changes to the stored instructions and data produce undesirable computational errors. Some computer systems, such as high-end servers, employ various forms of error detection and correction to manage DRAM errors, or even more permanent memory failures.

BRIEF DESCRIPTION OF THE DRAWINGS

FIG. 6 is a table 600 illustrating how mapping logic 500 of FIG. 5 maps physical addresses Aps[2:0] and Apc[2:0] to memory addresses Ams[2:0] and Amc[2:0] when register 505 is loaded with a configuration value Apso=111b.

FIG. 7 is a table 700 illustrating how mapping logic 500 of FIG. 5 maps physical addresses Aps[2:0] and Apc[2:0] to memory addresses Ams[2:0] and Amc[2:0] when register 505 is loaded with a configuration value Apso=101b.

FIG. 8 is a table 800 illustrating how mapping logic 500 of FIG. 5 maps physical addresses Aps[2:0] and Apc[2:0] to memory addresses Ams[2:0] and Amc[2:0] when register 505 is loaded with a configuration value Apso=100b.

FIG. 9 is a table 900 illustrating how mapping logic 500 of FIG. 5 maps physical addresses Aps[2:0] and Apc[2:0] to memory addresses Ams[2:0] and Amc[2:0] when register 505 is loaded with a configuration value Apso=011b.

FIG. 10 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=010b.

FIG. 11 is a table 1100 illustrating how mapping logic 500 of FIG. 5 maps physical addresses Aps[2:0] and Apc[2:0] to memory addresses Ams[2:0] and Amc[2:0] when register 505 is loaded with a configuration value Apso=001b.

FIG. 12 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=000b.

DETAILED DESCRIPTION

Figure 1:
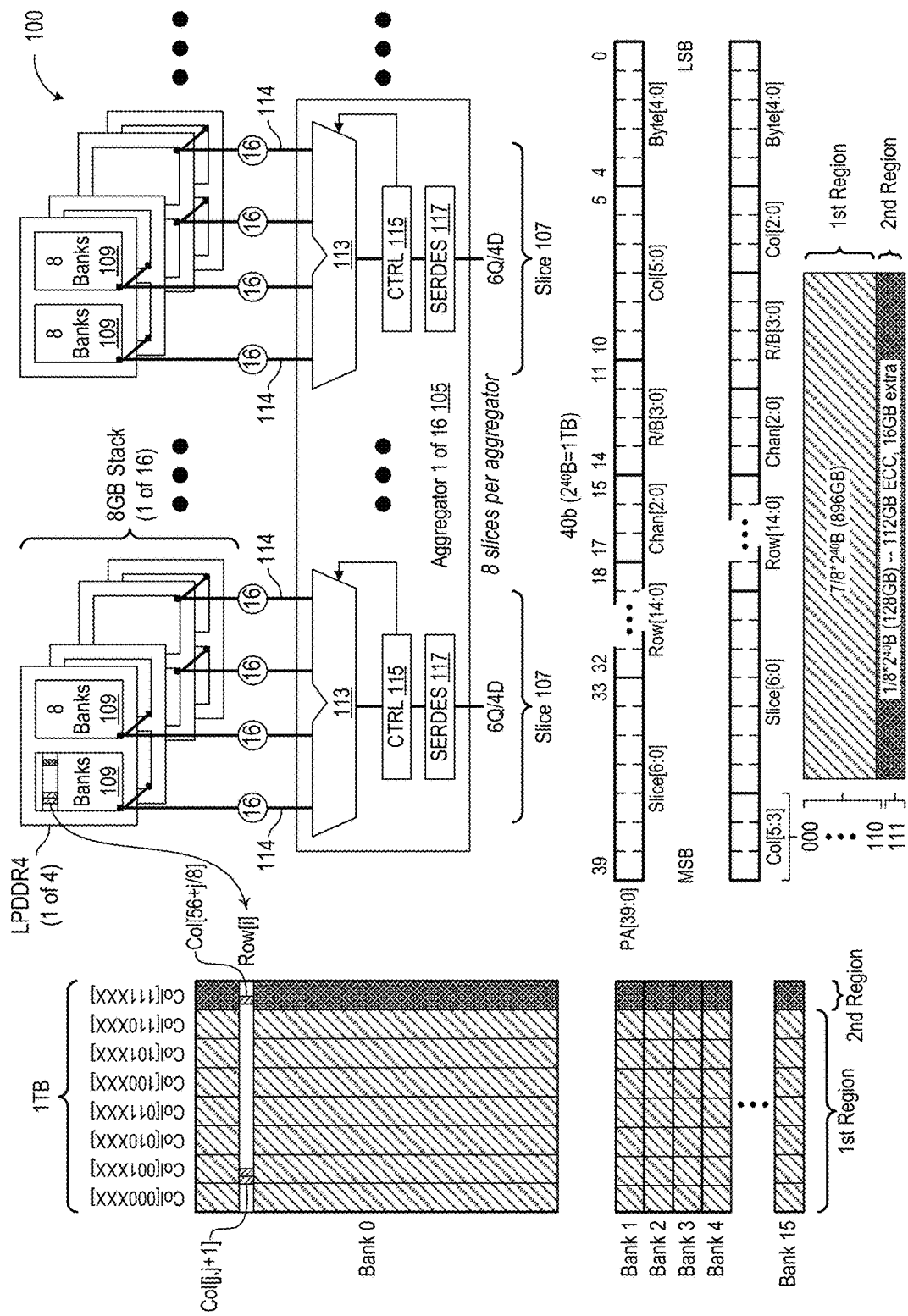
FIG. 1 details a memory system 100 that employs an addressing scheme to logically divide rows of memory cells into separate contiguous regions, one for data storage and another for error detection and correction (EDC) codes corresponding to that data.

FIG. 1 details a memory system 100 that employs an addressing scheme to logically divide rows of memory cells into separate contiguous regions, one for data storage and another for error detection and correction (EDC) codes corresponding to that data. When a given row is opened responsive to an access request for data, the EDC code for that data is in the same row and is thus available without opening another row. Accessing data and corresponding EDC code in the same row of the same bank advantageously saves power and avoids bank conflicts. Moreover, the addressing scheme partitions the memory in support of this efficiency without requiring the processor or controller issuing the access requests to have an understanding of the memory partition. Memory system 100 thus supports a power-efficient EDC scheme that is compatible with legacy systems.

Memory system 100 includes sixteen data aggregators 105, one of which is shown, each servicing memory requests from a memory controller and/or processor (not shown) via eight ten-conductor 6Q/4D primary links. One or more aggregators 105 can be integrated-circuit (IC) memory buffers that buffer and steer signals between an external processor and DRAM components. Each primary link 6Q/4D communicates with a corresponding memory slice 107, each of which includes an 8 GB memory component, a stack of four fourth-generation, low-power, double-data-rate (LPDDR4) memory die in this example. Each LPDDR4 die includes two sets of eight banks 109 coupled to a DRAM interface 113 that communicates data and control signals between the DRAM stacks and a serializer/deserializer SERDES 117 via respective local sixteen-trace channels 114. A local controller 115 in each slice 107 steers data via interface 113 responsive to access requests received from the corresponding 6Q/4D primary link.

In this example, one hundred twenty-eight 8 GB slices 107 provide a total of 1 TB of memory space addressable via forty-bit physical addresses PA[39:0] ($2^{40}B=1$ TB). From the requesting processor's perspective, the seven most-significant bits PA[39:33] specify a slice 107; bits PA[32:18] specify a row Row[i] of memory cells in banks 109; bits PA[17:15] specify a local channel 114; bits PA[14:11] specify a rank/bank; bits PA[10:5] specify a column; and bits PA[4:0] specify a byte. Of the rank/bank bits PA[14:11], three bits identify the rank and one bit distinguishes between two devices per secondary channel.

The external processor employing memory system 100 is configured to perceive memory system 100 as providing 896 GB. This first region, seven eighths of the usable capacity, is available to the external processor via slice-address bits Slice[6:0] in the range from 0000000b to 1101111b. In this context, "usable" memory refers to memory available to the local and remote processors, and is distinct from redundant columns of memory cells and related repair circuitry commonly included in DRAM devices to compensate for defective memory resources (e.g., defective memory cells).

Local controllers 115 can be configured to send an error message responsive to external memory requests that specify a slice address above this range (Slice[6:4] =111XXXXb]). The remaining eighth of the memory capacity, a second region of 112 GB in slice address range Slice[6:0]=111XXXXb, is inaccessible to the external processor but available to local controllers 115 to store e.g. EDC codes. Seven-eighths of the 1 TB of usable storage capacity of memory system 100 is thus allocated for data storage and one eighth reserved for e.g. EDC code storage.

Local controllers 115 remap physical address PA[10:8] to the three MSBs PA[39:37] so that the three MSBs specify the most-significant column-address bits Col[5:3]. The remaining address fields are shifted right three places in this example but can be otherwise rearranged in other embodiments. The three most-significant bits PA[39:37] of the physical address should never be 111b because the remote processor is address constrained to a maximum of 110111b. Because local controllers 115 remap the three most-significant bits to column-address bits Col[5:3], requests directed to memory system 100 will never be directed to column addresses 111XXXb. These high-order column addresses are thus reserved for EDC codes.

In the example of FIG. 1, a read request from an external processor seeks sixty-four bytes (64B) of data from memory system 100. The controller 115 associated with the addressed one of slices 107 uses the remapped physical address to issue successive local read requests to columns Col[j] and Col[j+1] of a row Row[i], receiving 32B for each column access. The controller 115 issues a third local read request to row Row[i] column Col[56+j/8] to read from one column in the second region. Eight bytes of this 32B column access provides an EDC code that the local controller 115 uses to detect and correct for errors. An error-detection code that does not support error correction can also be used.

Local controllers 115 take advantage of the remapped column-address bits to store data and related EDC codes in the same row of the same bank 109. As is typical in DRAM memory devices, a row of memory cells is "opened" in response to an access request, a process in which the values stored in each cell of the open row are sensed and latched. A column address then selects a column of latched bits to communicate via an external bus. Opening a row takes time and power. Reading the latched bits from different columns of the same open row is thus relatively fast and efficient. Likewise, local controllers 115 open only one row to write data and an associated EDC code the controllers 115 calculate from the data using well-known techniques.

Figure 2:
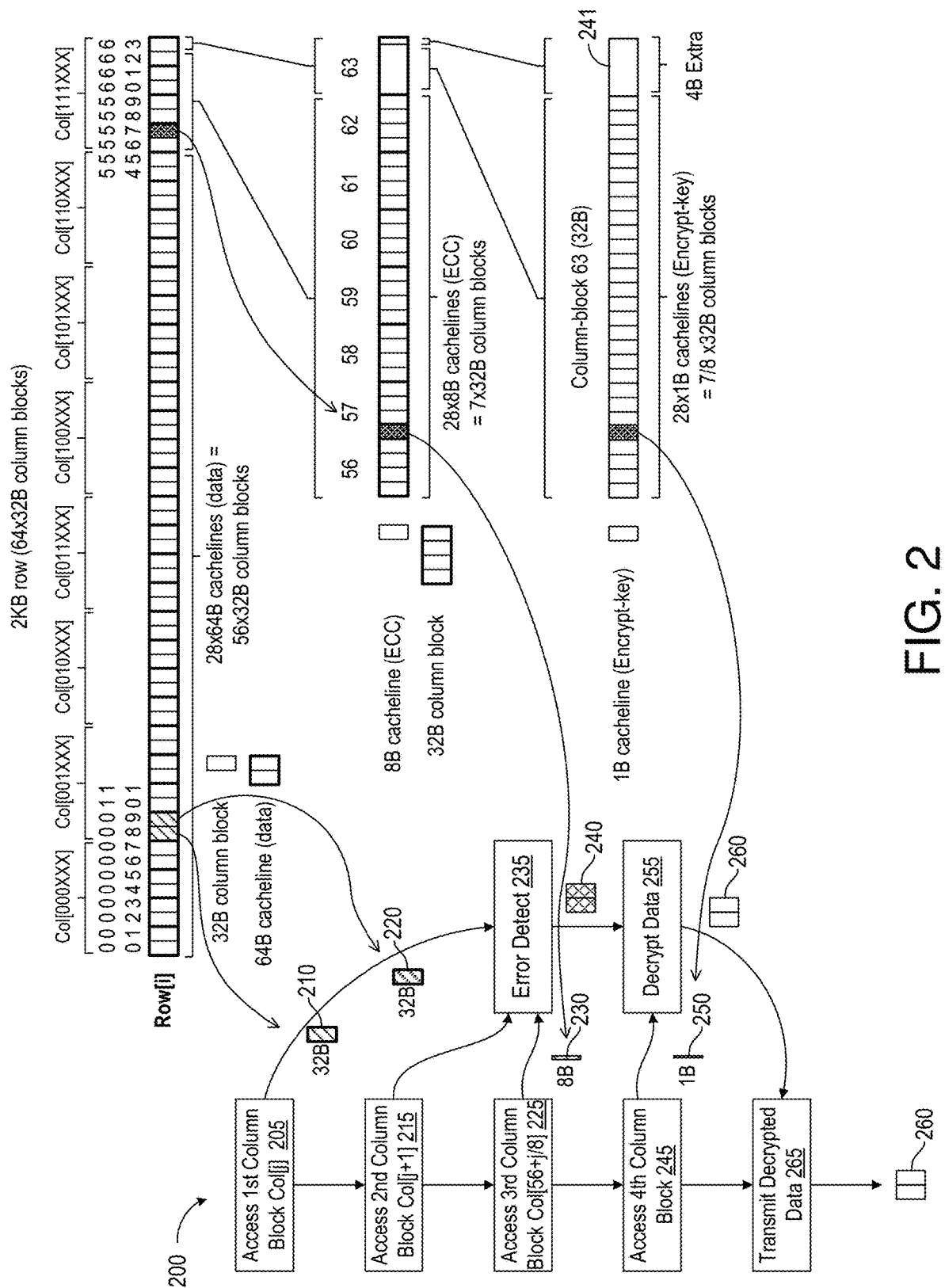
FIG. 2 shows an example of row Row[i] of FIG. 1 with a flowchart 200 outlining a succession of read accesses to that row, all of which can be initiated by a single read request from an external processor seeking 64B of read data.

FIG. 2 shows an example of row Row[i] of FIG. 1 with a flowchart 200 outlining a succession of read accesses to that row, all of which can be initiated by a single read request from an external processor seeking 64B of read data. In this example the read data is encrypted for storage in the first region of the memory. Local controller 115 uses EDC codes and encryption/decryption keys stored in the second region of the memory to both correct for errors and decrypt requested data.

Beginning with step 205, the selected local controller 115 directs a first access request to column Col[001000b] (or Col[08] decimal), receiving an encrypted 32B column block 210 in response. Local controller 115 sends a second read request 215 to column Col[001001b] (Col[09]) of the same row Row[i] to obtain a second encrypted 32B column block 220. A third read access 225 to Col[111001b] (Col[57]) reads a 32B column block comprised of four 8B cachelines, one cacheline for each pair of columns Col[001XXXb]. The selected local controller 115 uses the 8B EDC cacheline 230 associated with columns Col[001000b,0010001b] to detect and correct for errors (235) in column blocks 210 and 220, and thus to provide 64B of error-corrected data 240.

In this embodiment the error corrected data is encrypted, and column Col[111111b] (Col[63]) stores 28 byte-wide keys, one for each pair of columns in the first region, leaving an extra four bytes 241 for other purposes. In step 245, the selected local controller 115 reads the 1B key 250 associated with columns Col[001000b,0010001b] to decrypt error-corrected data 240 (process 255) and thus provide 64B of error-corrected, decrypted data 260. This data is passed to the SERDES 117 in the selected slice 107 and transmitted to the external processor that conveyed the initial read request (step 265). The order of column accesses to the same row can be different in other embodiments.

Figure 3:
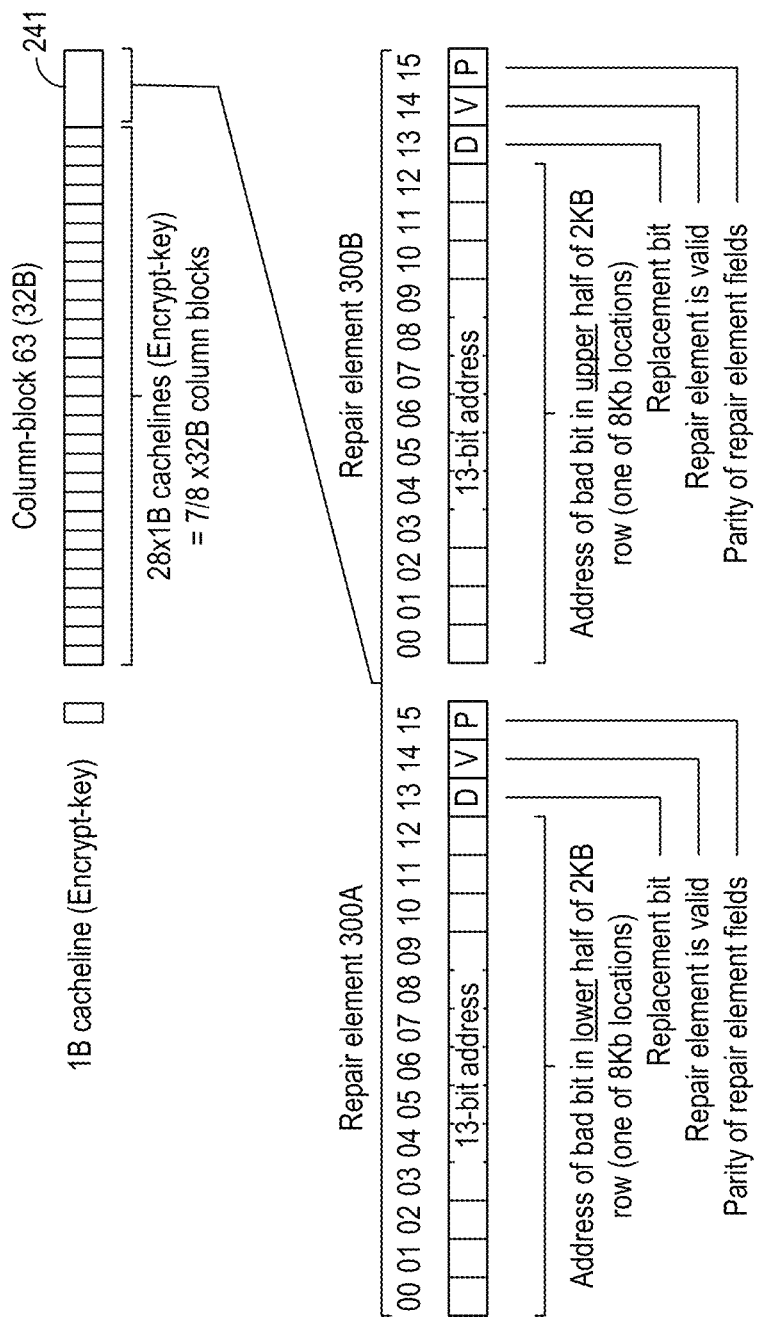
FIG. 3 illustrates how the extra four bytes 241 of 32B column-block Col[63] is used to store repair elements in one embodiment.

FIG. 3 illustrates how the extra four bytes 241 of 32B column-block Col[63] is used to store repair elements in one embodiment. Each 2 KB ($2^{14}$b) row includes two 16-bit repair elements 300A and 300B, one to substitute for one erroneous bit from the lower $2^{13}$ bits in the same row and another to substitute one erroneous bit from the upper $2^{13}$ bits. The same column access that provides the decryption key also yields repair elements 300A and 300B, which local controller 115 associates with respective halves of the bit addresses and employs to store replacement bits for defective bit addresses.

Local controller 115 can uses repair element 300A (300B) to store: (1) a 13-bit address to identify a defective bit location in the lower half (upper half) of the corresponding row; (2) a replacement bit D to replace a suspect bit read from the defective location; (3) a valid bit V set when local controller 115 noted the defective location and employed the repair element; and (4) a parity bit P local controller 115 set to one or zero during writes to the repair element such that the sum of the set of bits in the repair element is always even (or odd).

During a read transaction, local controller 115 considers whether either or both repair elements corresponds to a bit address retrieved in any column access of the pending transaction. If so, and if the valid and parity bits V and P indicate the availability of a valid, error-free replacement bit D, then control logic 115 substitutes the bit read from the defective location with replacement bit D. Control logic 115 may await consideration of repair elements 300A and 300B before applying ECC and decryption steps. For reduced latency, ECC and decryption steps may begin before and during consideration of repair elements 300A and 300B to be repeated with a replacement bit if a corresponding repair element is noted.

Figure 4:
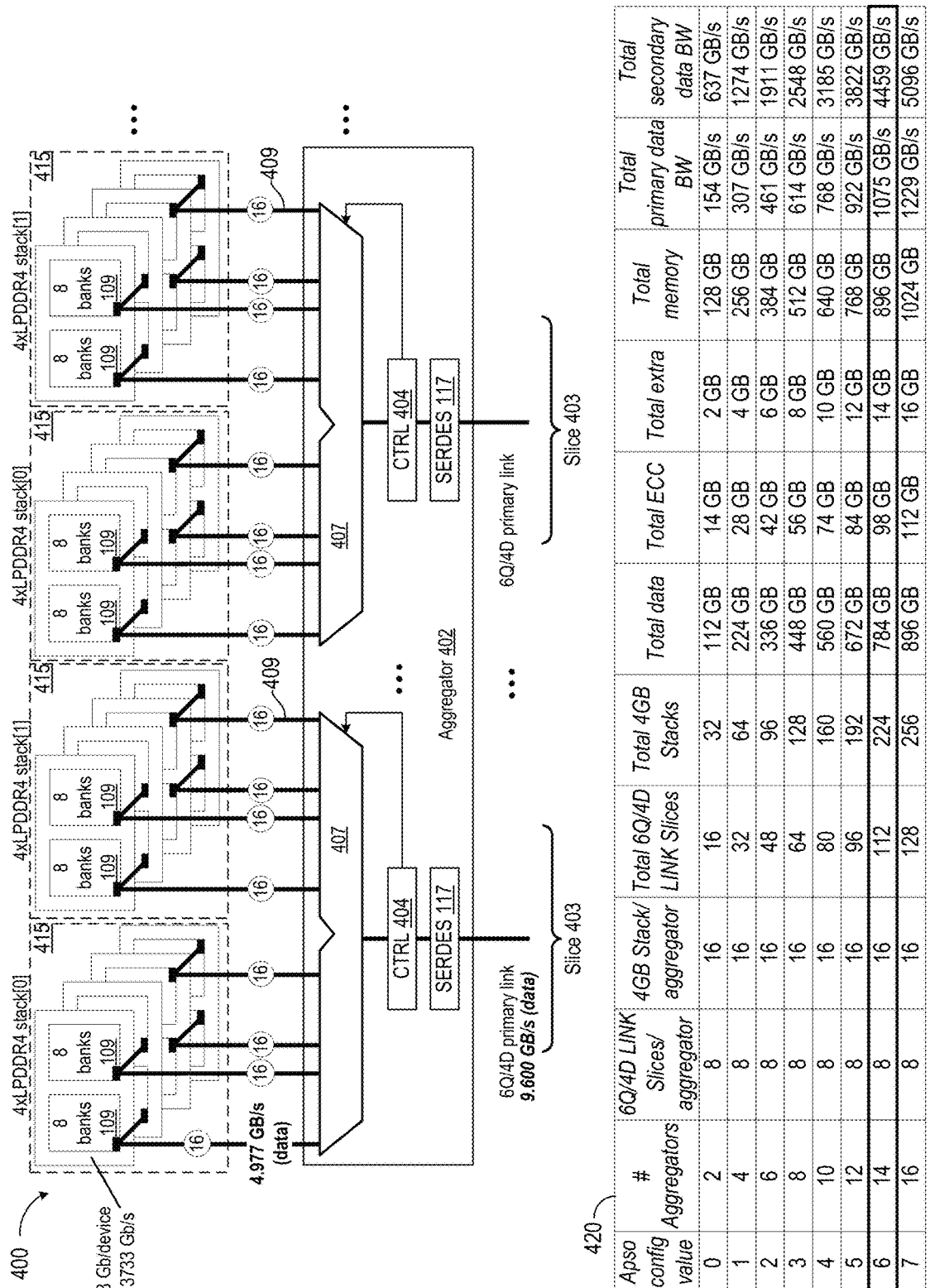
FIG. 4 details a memory system 400 that employs an addressing scheme similar to the one detailed above in connection with FIG. 1.

FIG. 4 details a memory system 400 that employs an addressing scheme similar to the one detailed above in connection with FIG. 1. Memory system 400 includes some number of aggregators 402, one of which is shown, each servicing memory requests from an external processor (not shown) via eight ten-conductor 6Q/4D primary links. Each primary link 6Q/4D communicates with a corresponding memory slice 403, each of which includes two 8 GB memory components, a stack of four fourth-generation, low-power, double-data-rate (LPDDR4) memory die in this example. Each LPDDR4 die includes two sets of eight banks 109 coupled to a DRAM interface 407 that communicates data and control signals between the DRAM stacks and a serializer/deserializer SERDES 117 via respective local sixteen-trace channels 409. A local controller 404 in each slice 403 steers data via interface 407 responsive to access request received from the corresponding 6Q/4D primary link.

Control logic (FIG. 5) within each local controller 404 alters the addressing scheme for local memory accesses responsive to a control value Apso that can be stored in a local configuration register (FIG. 5) to support 2, 4, 6, 8, 10, 12, 14, or 16 aggregators 402 and associated memory resources. This memory scheme therefore offers a range of available memory, as summarized in a table 420. The addressing scheme and related circuitry of system 400 can be used when the number of memory components (e.g. LPDDR4 stacks 405) is not a power of two.

Table 420 highlights a configuration corresponding to Apso value six (110b) in which fourteen aggregators 402 each support eight slices 403, and each slice provides access to two stacks 415 of four 8 GB memory devices, providing 896 GB of usable memory. Of this memory, $56/64$th is used for data storage and $7/64$th for EDC. The remaining $1/64$th is available for other uses. Each of the 112 6Q/4D primary links provides a data bandwidth of 9.6 GB/s for a total primary data bandwidth of 1,075 GB/s. Each secondary link provides a data bandwidth of 4.977 GB/s for a total secondary bandwidth of 4459 GB/s.

Figure 5:
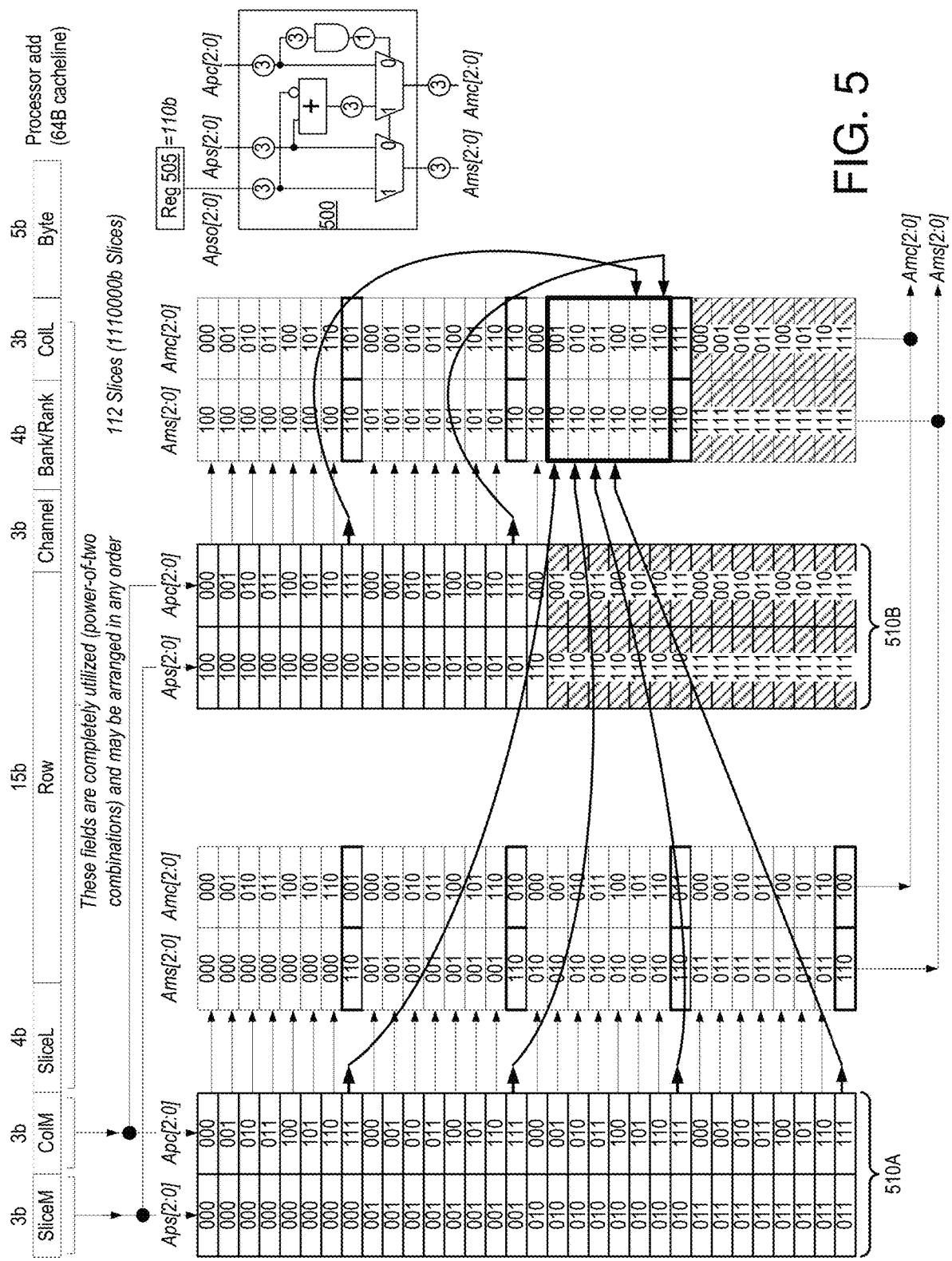
FIG. 5 illustrates how mapping logic 500 remaps physical addresses PA[39:0] responsive to an Apso configuration value stored in a local register 505, an Apso value of six in this configuration.

FIG. 5 illustrates how mapping logic 500 remaps physical addresses PA[39:0] responsive to an Apso configuration value stored in a local register 505, an Apso value of six in this configuration. A forty-bit physical address PA[39:0] (FIG. 1) arriving with an external memory request is remapped such that the three most-significant column bits ColM lie between the three most-significant slice bits SliceM and the four least-significant slice bits SliceL.

Slice bits SliceM are conveyed as physical slice address Aps[2:0] and column bits ColM are conveyed as physical column address Apc[2:0]. These six bits define sixty-four blocks in processor address space 510A/B. The region of processor address space 510A/B unavailable to the external processor is cross-hatched in space 510B.

Mapping logic 500 remaps addresses in which column address ColM is 111b to a higher address range, as indicated by arrows, to reserve column addresses Col[111XXXb] for EDC values, etc., as detailed in connection with memory system 100 of FIG. 1. Referring to mapping logic 500, when column address ColM is any value other than 111b physical slice address Aps[2:0] is used as the high-order memory slice address Ams[2:0] and physical column address Apc[2:0] is used as the high-order memory column address Amc[2:0]. When column address ColM is 111b, an AND gate causes a pair of multiplexers to substitute physical slice address Aps[2:0] for the value in register 505 and to change column address Apc[2:0] to a sum of slice address Aps[2:0] and the inverse of the Apso value in register 505.

FIG. 6 is a table 600 illustrating how mapping logic 500 of FIG. 5 maps physical addresses Aps[2:0] and Apc[2:0] to memory addresses Ams[2:0] and Amc[2:0] when register 505 is loaded with a configuration value Apso=111b. Address space unavailable to the requesting processor is crossed out. All of the available memory is available to the local controller.

FIG. 7 is a table 700 illustrating how mapping logic 500 of FIG. 5 maps physical addresses Aps[2:0] and Apc[2:0] to memory addresses Ams[2:0] and Amc[2:0] when register 505 is loaded with a configuration value Apso=101b. Address space unavailable to the requesting processor and local controller is crossed out.

FIG. 8 is a table 800 illustrating how mapping logic 500 of FIG. 5 maps physical addresses Aps[2:0] and Apc[2:0] to memory addresses Ams[2:0] and Amc[2:0] when register 505 is loaded with a configuration value Apso=100b. Address space unavailable to the requesting processor and local controller.

FIG. 9 is a table 900 illustrating how mapping logic 500 of FIG. 5 maps physical addresses Aps[2:0] and Apc[2:0] to memory addresses Ams[2:0] and Amc[2:0] when register 505 is loaded with a configuration value Apso=011b. Address space unavailable to the requesting processor and local controller is crossed out.

FIG. 10 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=010b. Address space unavailable to the requesting processor and local controller is crossed out.

FIG. 11 is a table 1100 illustrating how mapping logic 500 of FIG. 5 maps physical addresses Aps[2:0] and Apc[2:0] to memory addresses Ams[2:0] and Amc[2:0] when register 505 is loaded with a configuration value Apso=001b. Address space unavailable to the requesting processor and local controller is crossed out.

FIG. 12 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=000b. Address space unavailable to the requesting processor and local controller is crossed out.

Figure 13:
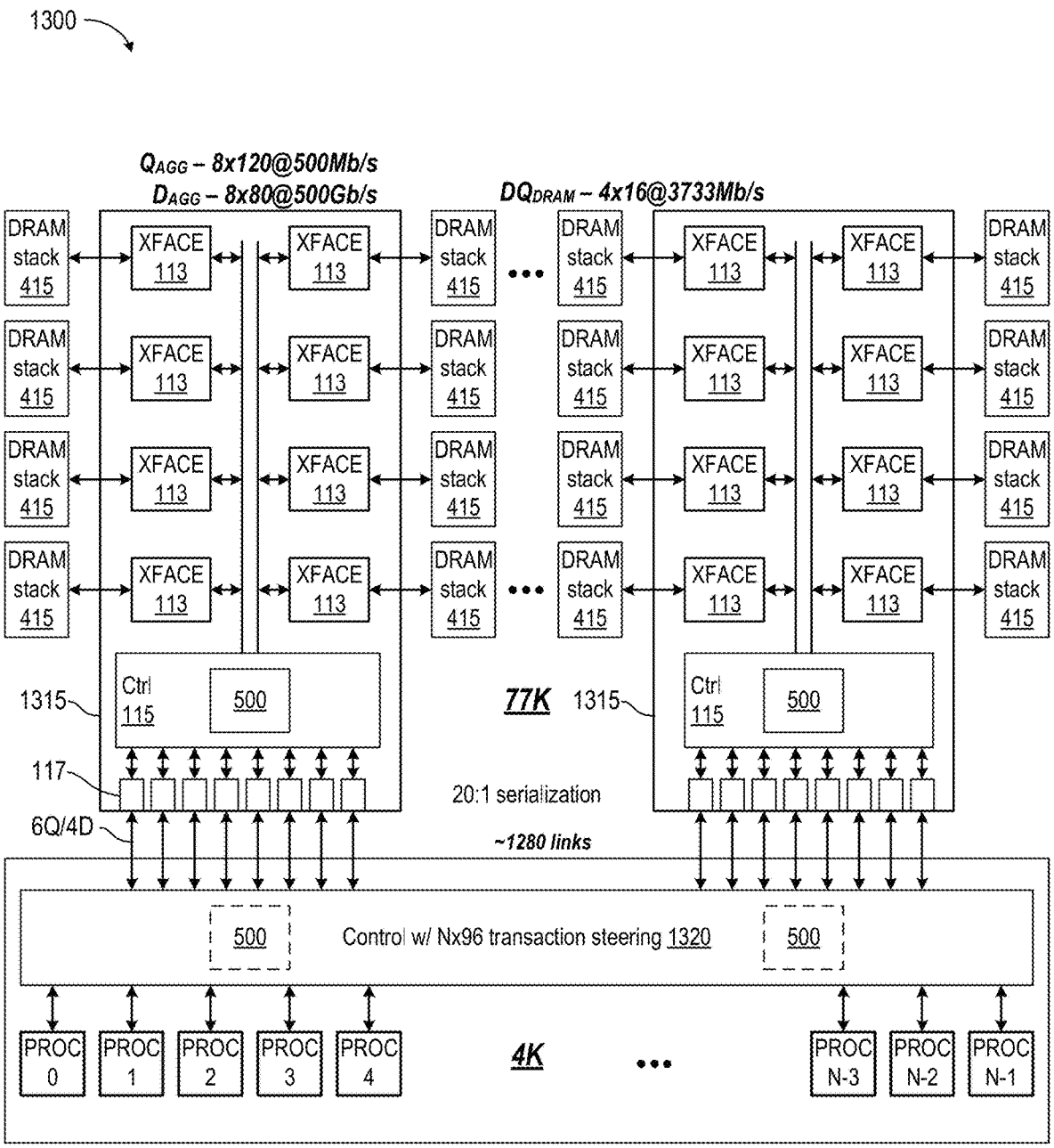
FIG. 13 depicts a cold memory system 1300 in accordance with one embodiment.

FIG. 13 depicts a cold memory system 1300 in accordance with one embodiment. The adjective "cold" refers to operating temperature. The memory subsystem operates at e.g. 77K, whereas the processor subsystem operates at e.g. 4K. Memory system 1300 includes sixteen aggregators 1315 in the 77K domain, each connected to the 4K domain via eight primary 6Q/4D links. As in the example of FIGS. 4 and 5, mapping logic 500 is part of local controller 115. In other embodiments some or all of this control functionality is provided on a primary controller 1320 in the 4K domain that serves e.g. N processors that initiate memory transactions with the DRAM stacks in the manner detailed previously. When mapping logic 500 is placed in aggregators 1315, the different capacity cases adjust the number of stacks per aggregator {2,4,6,8,10,12,14,16} and the number of 6Q/4D LINK groups per aggregator {1,2,3,4,5,6,7,8}. The number of aggregators 1315 is fixed at sixteen. When mapping logic 500 is placed in the steering logic in the 4K domain, the different capacity cases adjust the number of aggregators {2,4,6,8,10,12,14,16}. The number of 6Q/4D link groups per aggregator 1315 is fixed at eight, and the number of stacks 415 per aggregator 1315 is fixed at sixteen. In either case the six Q links for each 6Q/4D slice communicate 8×6 bits at 10 Gb/s, whereas the four D links communicate 8×4 bits at 10 Gb/s.

Figure 14:
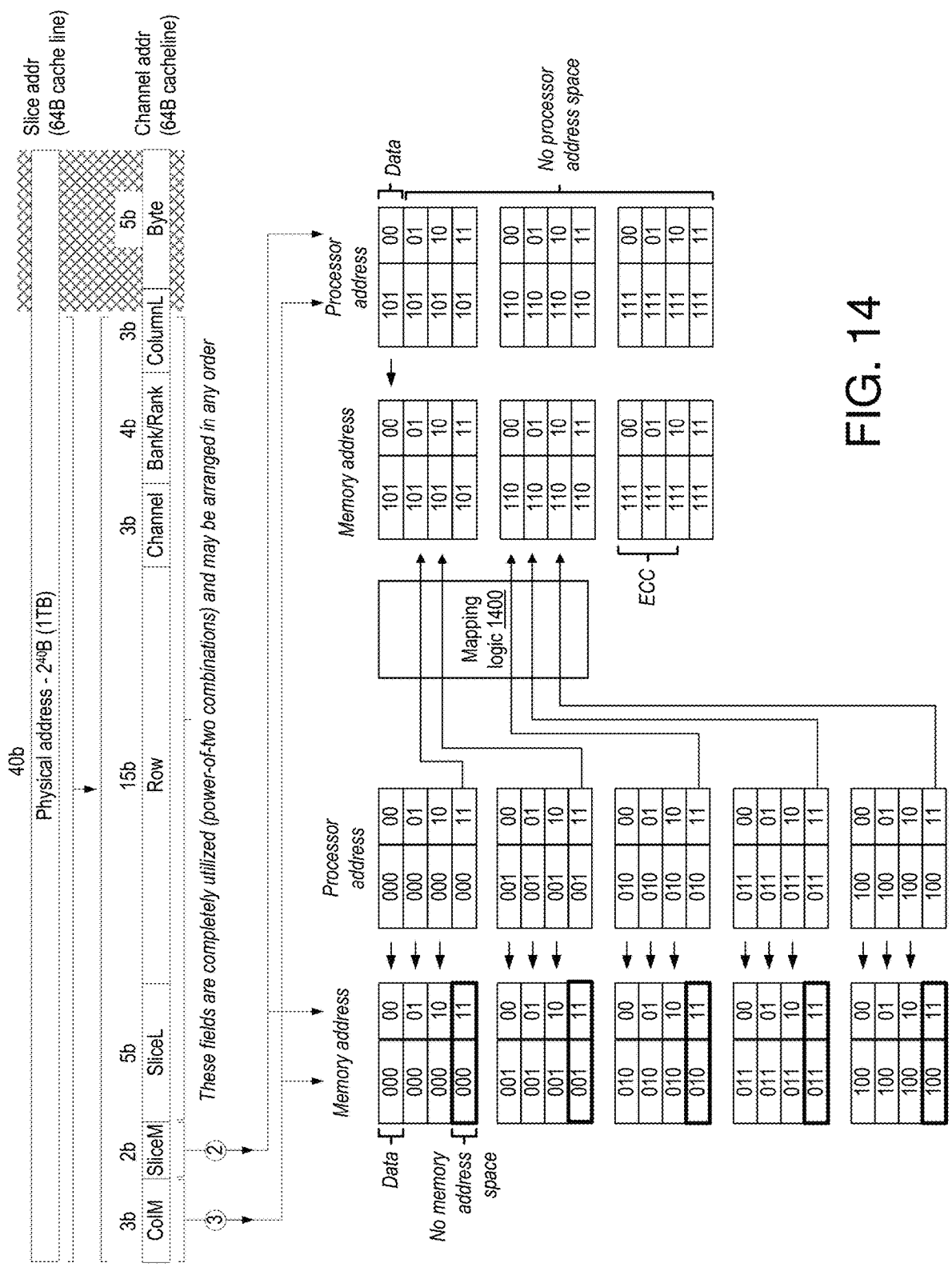
FIG. 14 depicts an address-mapping scheme in accordance with another embodiment that performs three column transactions per row activation.

FIG. 14 depicts an address-mapping scheme in accordance with another embodiment that performs three column transactions per row activation. Mapping logic 1400 maps the three most-significant bits of the physical address to the three most-significant column-address bits ColM and the next two bits to the two most-significant slice bits SliceM. The memory system employing this scheme is assumed to have a number of slices that is not a power of two, ninety-six in this example. The address-mapping scheme of FIG. 14 is similar to that of FIG. 4 except that the column and slice fields are reversed, and the slice field uses but two bits. Mapping logic 1400 uses high-order address blocks to fill holes in the memory address space.

Figure 15:
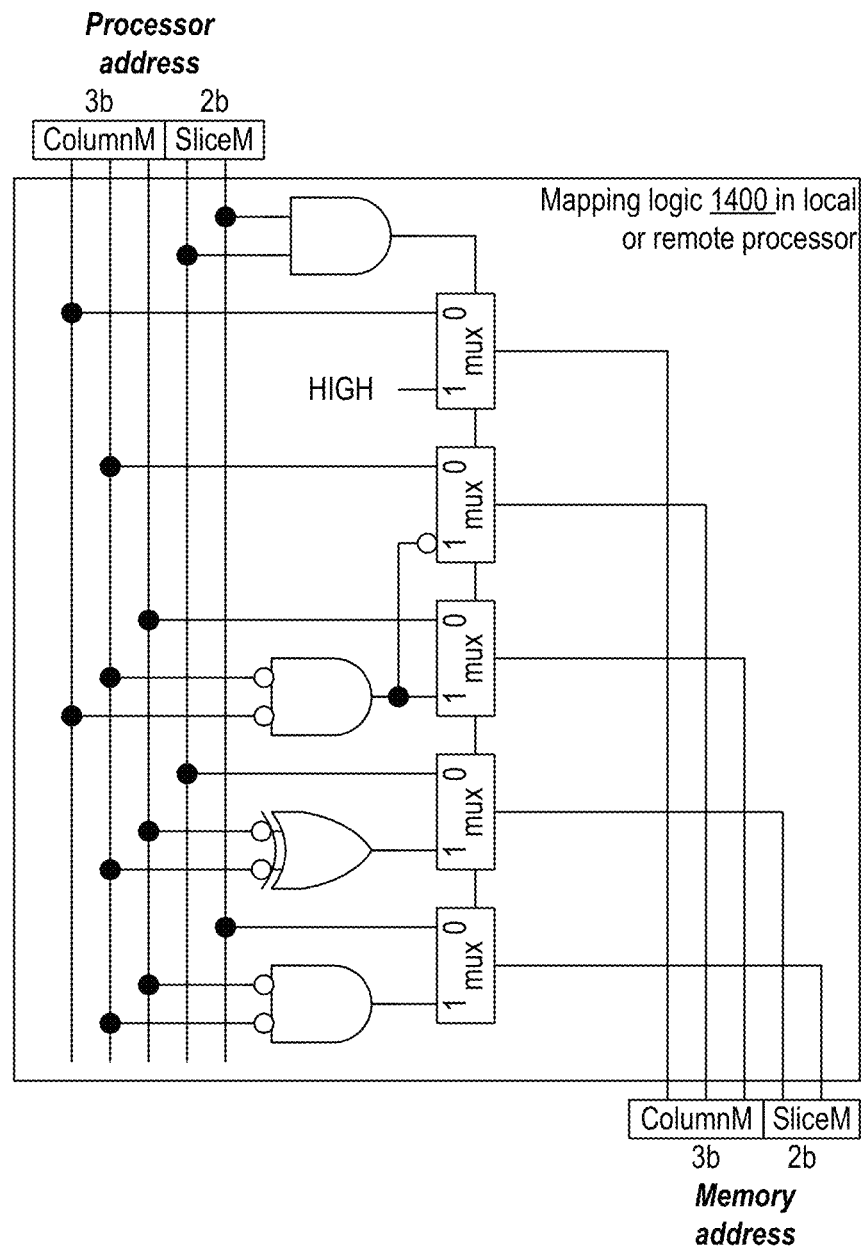
FIG. 15 details an embodiment of mapping logic 1400 of FIG. 14.

FIG. 15 details an embodiment of mapping logic 1400 of FIG. 14. Mapping logic 1400 is simpler than mapping logic 500 of the prior embodiment but becomes more complex if the SliceM field is extended to three or more bits.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An integrated-circuit (IC) to service an external read request specifying a read address directed to memory having rows and columns of memory cells, the rows of memory cells having contiguous first and second regions of memory cells, the IC comprising:
    an external interface to receive the external read request specifying the read address; and
    a memory interface to issue successive local read requests to the memory and responsive to the external read request, the local read requests including:
        a first local read request specifying one of the rows of the memory cells and to a first of the columns of the memory cells in the first region to read first data;
        a second local read request directed to the one of the rows of the memory cells and to a second of the columns of the memory cells in the first region to read second data; and
        a third local read request directed to the one of the rows of the memory cells and to a third of the columns of the memory cells in the second region to read third data; and
        error-detection-and-correction (EDC) circuitry to receive and issue error-corrected data responsive to the first data, the second data, and the third data from the specified one of the rows of the memory cells.

2. The IC of claim 1, wherein the first column of the columns of memory cells and the second of the columns of memory cells are contiguous memory cells in the one of the rows, and the third column of the memory cells is separate from the first column of memory cells and the second column of memory cells in the one of the rows.

3. The IC of claim 1, wherein the read address has fewer than N address bits and the memory has at least $8 \times 2^N$ usable memory cells.

4. The IC of claim 1, wherein the memory interface performs a row activation on the row of memory cells and stores the first and second read data responsive to the row activation.

5. A method of accessing a memory comprising memory cells arranged in rows of the memory cells and columns of the memory cells, the rows of memory cells having separate contiguous first and second regions of memory cells, the first region having more of the memory cells than the second region, the method comprising:
    receiving an external read requests specifying respective read addresses; and
    responsive to each of the external read requests:
        issuing a first internal read request to a row and to a first of the columns of the memory cells at a first column address in the first region;
        mapping the first column address to a second column address in the second region using a mapping that maps every column address in the first region to the second region;
        issuing a second internal read request to the row and to a second of the columns of the memory cells at the second column address in the second region;
        receiving first and second data from the row and responsive to the first and second internal read requests; and
        issuing error-corrected data responsive to the first and second data.

6. The method of claim 5, further comprising, for each of the external read requests, issuing a third internal read request to the row and to a third of the columns of the memory cells at a third column address in the first region to receive third data, and issuing the error-corrected data responsive to the first, second, and third data.

7. The method of claim 6, wherein each of the first of the columns of the memory cells is adjacent to one of and the third of the columns of memory cells and each of the second of the columns of memory cells is separate from all of the first of the columns of the memory cells.

8. The method of claim 6, further comprising activating the one of the rows of memory cells for a row activation and reading the first, second, and third data during the row activation.

9. The method of claim 6, wherein the first, second, and third data include a key, the method further comprising decrypting some of the first, second, and third data using the key.

10. The method of claim 9, wherein the row of the memory cells includes a total number of the memory cells and the key includes a total number of bits that is 1/512 of the total number of the memory cells in the row.

11. A circuit for aggregating write data with a corresponding error-correction code in a row of an array of rows and columns of memory cells, the rows of memory cells divided into first and second contiguous regions, the circuit comprising:
    an external interface to receive an external write request specifying a write address and accompanied by the write data;
    an internal memory interface to the memory cells; and
    a local controller to respond to the external write request, the local controller to:
        calculate the error-correction code from the write data; and
        write the write data to the row in first and second columns of the memory cells in the first region and write the error-correction code to the same row of memory cells in a third column of the row of memory cells.

12. The circuit of claim 11, the local controller to further calculate at least one of two column addresses for the respective columns from the other of the column addresses.

13. The circuit of claim 12, wherein the calculating comprising applying an offset to one of the column addresses.

14. The circuit of claim 13, the local controller further to write the write data to two of the columns of the memory cells in the row of memory cells and the error-correction code in a third of the columns of memory cells in the row of memory cells.

15. The circuit of claim 14, wherein the two of the columns of the memory cells with the write data are contiguous columns in one of the rows and the third of the columns of memory cells in the one of the rows is separate from the contiguous columns.

16. The circuit of claim 11, the local controller to activate the one of the rows of memory cells for a row activation and write the data and the error-correction code during the row activation.

17. The circuit of claim 11, the local controller further to write a key with the error-correction code in the same column of the row of memory cells.

* * * * *